US008689195B2

(12) United States Patent
Triplett (10) Patent No.: US 8,689,195 B2
(45) Date of Patent: Apr. 1, 2014

(54) IDENTIFYING STRUCTURED DATA TYPES AS REQUIRING DESIGNATED INITIALIZERS (75) Inventor: Joshua A. Triplett, Hillsboro, OR (US)

(73) Assignee: International Business Machines Corporation, Armonk, NY (US)

(*) Notice: Subject to any disclaimer, the term of this patent is extended or adjusted under 35 U.S.C. 154(b) by 1701 days.

(21) Appl. No.: 12/131,972

(22) Filed: Jun. 3, 2008

(65) Prior Publication Data
US 2009/0300581 A1 Dec. 3, 2009

(51) Int. Cl.
G06F 9/45 (2006.01)

(52) U.S. Cl.
USPC ........... 717/143; 717/120; 717/121; 717/126; 717/114; 715/237

(58) Field of Classification Search
USPC .......... 717/101–178; 714/25, 36, 38.1, 38.14; 715/237
See application file for complete search history.

(56) References Cited

U.S. PATENT DOCUMENTS

| 4,667,290 | A | * | 5/1987 | Goss et al. ..................... 717/147 |
| 5,481,712 | A | * | 1/1996 | Silver et al. .................... 717/109 |
| 5,652,884 | A | * | 7/1997 | Palevich ............................. 713/1 |
| 5,737,609 | A | * | 4/1998 | Reed et al. ..................... 717/126 |
| 5,889,992 | A | * | 3/1999 | Koerber ......................... 717/108 |
| 5,995,753 | A | * | 11/1999 | Walker .......................... 717/108 |
| 6,085,034 | A | * | 7/2000 | Danforth ....................... 717/108 |
| 6,085,337 | A | * | 7/2000 | Mattheis et al. ................ 714/30 |
| 6,110,227 | A | * | 8/2000 | Marcelais et al. ............. 717/170 |
| 6,154,876 | A | * | 11/2000 | Haley et al. ................... 717/133 |
| 6,243,860 | B1 | * | 6/2001 | Holland ......................... 717/141 |
| 6,425,119 | B1 | | 7/2002 | Jones et al. |
| 6,721,941 | B1 | * | 4/2004 | Morshed et al. .............. 717/127 |
| 6,968,543 | B2 | * | 11/2005 | Takahara et al. .............. 717/140 |
| 6,973,640 | B2 | | 12/2005 | Little et al. |
| 7,076,784 | B1 | * | 7/2006 | Russell et al. ................ 719/315 |
| 7,127,704 | B2 | | 10/2006 | Van de Vanter et al. |
| 7,171,588 | B2 | * | 1/2007 | Friedman et al. .......... 714/38.12 |
| 7,568,196 | B2 | * | 7/2009 | Krebs ........................... 718/100 |
| 7,610,482 | B1 | * | 10/2009 | Lok .................................. 713/2 |
| 7,665,063 | B1 | * | 2/2010 | Hofmann et al. ............. 717/111 |
| 7,681,186 | B2 | * | 3/2010 | Chang et al. .................. 717/143 |
| 7,818,719 | B2 | * | 10/2010 | Meijer et al. .................. 717/116 |
| 7,890,928 | B2 | * | 2/2011 | Patrudu ........................ 717/114 |
| 7,971,194 | B1 | * | 6/2011 | Gilboa .......................... 717/136 |
| 2002/0095661 | A1 | * | 7/2002 | Angel et al. .................. 717/130 |
| 2003/0237027 | A1 | * | 12/2003 | Cook .............................. 714/38 |
| 2004/0153786 | A1 | * | 8/2004 | Johnson et al. ................ 714/25 |

(Continued)

OTHER PUBLICATIONS

NPL-Implementation of a Debugging Aid for Logic Errors in Pascal Programs—Trevor Luckey, Kenneth D. Loose, David R. Hill—Department of Computer Science University of Calgary, Canada—vol. 19 Issue 1, Feb. 1987.*

(Continued)

Primary Examiner — Lewis A Bullock, Jr.
Assistant Examiner — Francisco Aponte
(74) Attorney, Agent, or Firm — Walter W. Duft (57) ABSTRACT A technique for enforcing the use of designated initializers in structured type initializations may include determining whether structured data type requires designated initialization, determining whether an initialization of a structured variable declared to use the structured data type employs an improper initializer that is inconsistent with said structured data type, and performing a diagnostic action if the initialization comprises an improper initializer.

17 Claims, 4 Drawing Sheets

(56) References Cited

U.S. PATENT DOCUMENTS

| | | | | |
|---|---|---|---|---|
| 2004/0268309 | A1* | 12/2004 | Grover et al. | 717/120 |
| 2005/0273771 | A1* | 12/2005 | Chang et al. | 717/136 |
| 2007/0028212 | A1* | 2/2007 | Meijer et al. | 717/116 |
| 2007/0061797 | A1 | 3/2007 | Attsatt et al. | |
| 2007/0101193 | A1* | 5/2007 | Johnson et al. | 714/25 |
| 2007/0256055 | A1 | 11/2007 | Herscu | |

OTHER PUBLICATIONS

Implementation of a Debugging Aid for Logic Errors in Pascal Programs—Trevor Lukey, Kenneth D. Loose, David R. Hill—Department of Computer Science The University of Calgary Calgary, Alberta, Canada—1987.*

Run-time Detection of Undefined Variables Considered Essential—Willett Kempton Visible Software, Box 7788, Princeton Ivy—Division of Information Technology and Computing, iVational Physical Laboratory, Teddington, Middlesex U.K.—Apr. 1990.*

D. Roundy, "[Haskell] pattern matching on record fields and position," <http://haskell.org/pipermail/haskell/2005-November/016729.html>, Nov. 2, 2005, 2 pages.

R. Meyers, "The New C: Declarations & Initializations," Dr. Dobb's Portal, Apr. 1, 2001, 6 pages.

R. Stallman et al., "Using the GNU Compiler Collection," GNU Press, 2005, 504 pages.

* cited by examiner

IDENTIFYING STRUCTURED DATA TYPES AS REQUIRING DESIGNATED INITIALIZERS

BACKGROUND OF THE INVENTION

1. Field of the Invention

The present invention relates to computer programming languages having structured data types. More particularly, the invention concerns language processing techniques for supporting the initialization of variables based on structured data types with designated initializers.

2. Description of the Prior Art

By way of background, many programming languages have structured data types whose elements are defined by an ordered group of named fields, each usually having an associated type. The "struct," "array" and "union" variables of the C programming language are examples. When declaring a variable that has a structured data type, many languages allow an initializer within the declaration that assigns initial values for the fields. Depending on the language, the initializer may contain only a group of values in the same order as the fields of the structured data type, called positional initializers, or it may contain a group of pairs of field names and corresponding values, called designated initializers.

Using positional initializers and relying on the order of the fields of the structured data type to initialize variables can in some cases prove error-prone and burdensome. An example would be a data structure whose elements are function pointers to a set of related operations, such as a set of file system operations for a file system. If the structured data type definition used to define the operations is modified so that the order of the fields changes, or if fields are removed or added (e.g., to remove or add operations), the meaning of one or more positional initializers in variable declarations based on this data type will likely change. Unless this leads to a type mismatch between a field and the corresponding value, language processors (such as compilers, interpreters, static analysis tools, semantic patch tools, etc.) cannot give an error, warning, or other diagnostic information when processing the variable declarations. Furthermore, whether or not language processors can issue a diagnostic, changing the fields of the structured data type will still require changing every positional initializer for declared variables of that type, which may prove prohibitive for large, complex software systems. Finally, some structured data types have many fields but users of those structured data types only utilize a smaller subset of the fields. For example, the file system data structure "struct file_operations" of version 2.6.24 of the Linux® kernel defines fields for 26 function pointers. However, most file systems do not implement 26 different file system operations. For example, the data structure "ext3_file_operations" for the Ext3 file system only fills in 12-13 of these function pointer fields (depending on the kernel configuration). Positional initializers for such variables must therefore include many placeholder values (such as NULL in the C programming language), and initializing the correct field requires counting out the correct number of placeholder values.

Designated initializers address these issues. By identifying fields by name, designated initializers will continue to work correctly even if the fields of the structured data type change, as long as the fields named in the designated initializer do not change. Furthermore, changing an existing field will only affect designated initializers that use the field, not necessarily all designated initializers. Finally, designated initializers remove the need for placeholder values.

Many large, complex systems make use of designated initializers for these reasons. For example, the Linux® kernel has long used C-language designated initializers, first via a GCC (GNU Compiler Collections) extension to the C89 standard, and later via the standard C99 syntax. For the reasons outlined above, many structured variables in the Linux® kernel should, by convention, only be declared with designated initializers, never positional initializers. Such data structures include, but are not limited to, the various data structures comprised of groups of function pointers representing related operations that may expand to include more operations at a later time. However, only convention and code review processes enforce the use of designated initializers.

SUMMARY OF THE INVENTION

A method, system and computer program product are provided for enforcing the use of designated initializers in structured type initializations. The technique may include determining whether a structured data type requires designated initialization, determining whether an initialization of a structured variable declared to use the structured data type employs an improper initializer that is inconsistent with the structured data type, and performing a diagnostic action if the initialization comprises an improper initializer.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXAMPLE EMBODIMENTS

Figure 1:
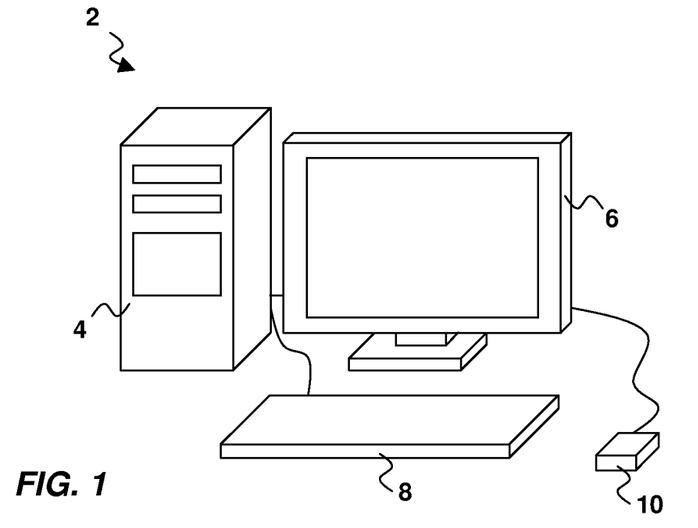
FIG. 1 is a diagrammatic illustration showing an example data processing system that may be used to implement language processing in accordance with the present disclosure.

Turning now to the figures, wherein like reference numerals represent like elements in all of the several views, FIG. 1 illustrates one example of a computing environment in which the language processing technique described herein may be implemented. In particular, a generic configuration of a computing system 2 is shown. It should be understood that the physical size, shape and arrangement of components of FIG. 1 is completely arbitrary and is set forth merely for purposes of illustration and not by way of limitation. The system 2 may be constructed using conventionally available computer hardware components, which may include some type of enclosure 4, a display 6 capable of generating text output (and possibly graphics images), a keyboard or keypad input device 8, and possibly a pointer input device 10 (such as a mouse). The system 2 may be implemented using any of a variety of existing computers and other data processing or digital systems and devices, including but not limited to mainframe and midrange computers, work stations, desktop computers, laptop computers, gaming consoles, television set-top devices such as digital television receivers and digital video recording devices, and handheld or portable devices such as personal digital assistants, mobile telephones, portable entertainment systems, etc. The system 2 may be a standalone system or it may interact with external devices that communicate with the system 2, such as other computing nodes in multi-node network, including a cluster or other scaled architecture.

Figure 2:
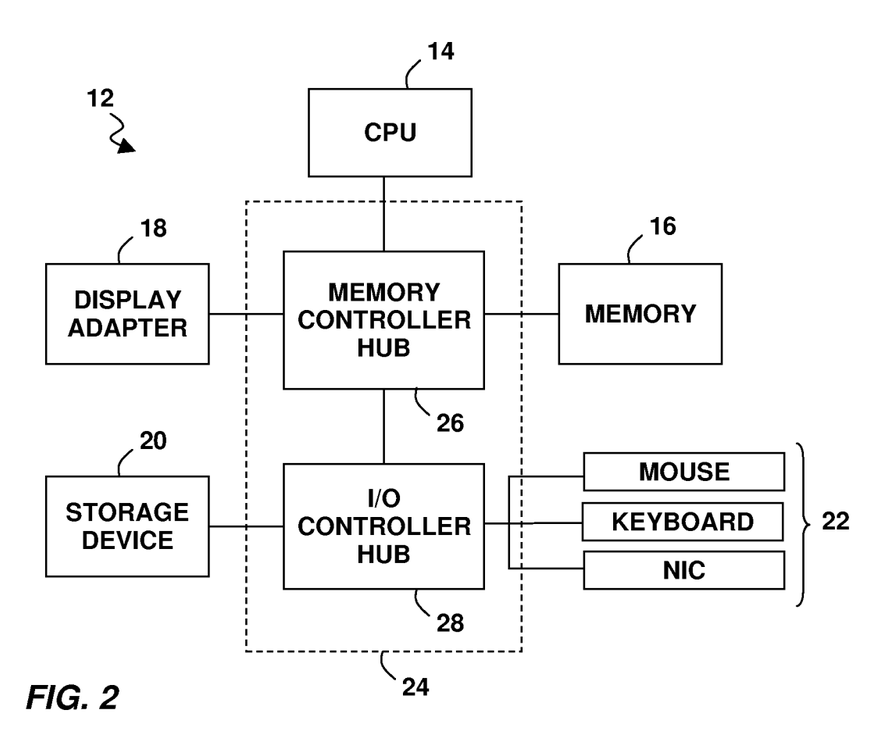
FIG. 2 is a functional block diagram showing example internal hardware components that may be used to implement the system of FIG. 1.

FIG. 2 illustrates example internal components 12 that may be contained within the enclosure 4 and used to implement the system 2 of FIG. 1. The components 12 may include one or more CPUs or other logic-implementing hardware 14 that may operate in conjunction with a memory 16 to provide a data processing core. Additional components may include a display adapter 18 for generating visual output information to the display device 6 (e.g., text and/or graphics), a peripheral storage device 20 (e.g., a disk or tape storage device), and various peripheral devices 22 that may include the key input device 8 and the pointer input device 10 of FIG. 1. The peripheral devices 22 may also include other I/O resources, such as a network interface card (NIC), a USB bus controller (not shown), a SCSI disk controller (not shown), etc. A bus infrastructure 24, which may include a memory controller hub 26 and an I/O (input/output) controller hub 28, can be used to interconnect the foregoing elements. It should be understood that the components 12 are exemplary in nature and that other component arrangements may also be used to implement the internals of the system 2.

Figure 3:
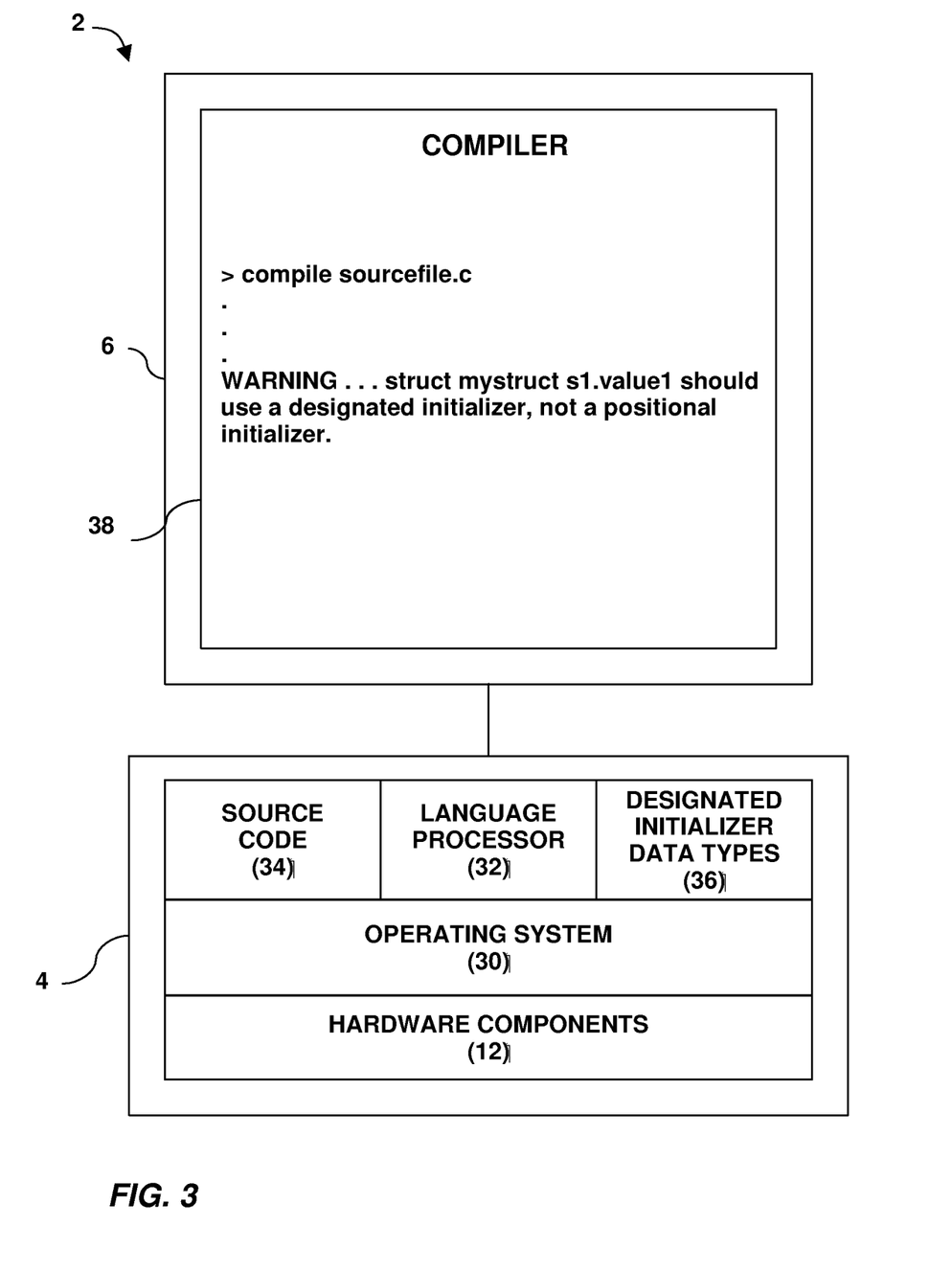
FIG. 3 is a functional block diagram showing example logic of the system of FIG. 1.

Turning now to FIG. 3, various logic components for controlling the system 2 are shown. Reference numeral 30 represents an operating system that may be provided by any conventional operating system program capable of controlling the underlying hardware components 12, including but not limited to general purpose operating systems, embedded operating systems, guest operating systems running in a virtual machine, virtual machine managers, hypervisors, etc. Reference numeral 32 represents a language processor that processes program instructions written in a suitable programming language. By way of example, the language processor 32 may be a compiler, an interpreter, a static analysis tool, a semantic patch tool, or any other logic that performs its operations numerically as a machine (as opposed to non-numeric processing and analysis performed by a human). Reference numeral 34 represents source code that may be compiled, interpreted or otherwise processed or analyzed by the language processor 32. Reference numeral 36 is optional and represents an information resource such as a list, database or other information entity that identifies data types of the source code 32 that require designated initializers. Reference numeral 38 represents an example user interface (UI) on the display device 6 that may be used to interact with the language processor 32.

As described the Background section above, conventional language processors cannot enforce the use of designated initializers when declaring and/or initializing structured variables based on structured data type definitions. They do not give an error, warning, or other diagnostic information when processing the variable declarations/initializations, nor do they perform other actions such as refusing to build object code. As described in more detail below, the language processor 32 is designed to provide such enforcement, thereby aiding in the software development process by eliminating sources of programming errors and reducing software maintenance burdens.

To facilitate the discussion to follow, consider the following example of a C-language structured data type definition:

```
struct my_struct {
    uint32_t flags;
    char *value1;
    uint32_t value2;
};
```

This structured data type definition defines a C-language "struct" data type called "my_struct." The fields of the "my_struct" data type include a "flags" element of type "uint32_t" (an unsigned integer data type), a "value" element of type "char *" (a pointer to a character data type) and a "value2" element of type "uint32_t" (the same unsigned integer data type as "flags").

The following structured variable declarations based on the "my_struct" data type initialize the variable using positional initializers:

```
struct my_struct s1 = {THING_1 & THING_2, one, two};
struct my_struct s2 = {THING_1, one};
struct my_struct s3 = {THING_1, , two};
```

In the declaration of the structured variable "s1," the elements "flags," "value1" and "value 2" of the "my_struct" structured data type are each assigned a value. In the declaration of the structured variable "s2," only the "flags" and "value1" elements are assigned values. In the declaration of the structured variable "s3," only the "flags" and "value2" elements are assigned values. Note that a placeholder is required for the "value1" element even though it was not initialized. If the "my_struct" structured data type had numerous fields that are not always initialized, the task of declaring and initializing many "my_struct" variables in a software project could become quite burdensome.

The following structured variable declarations based on the "my_struct" data type initialize the variable using designated initializers:

```
struct my_struct s1 = {.flags=THING_1,    .value1=one,
    .value2=two};
struct my_struct s2 = {.flags=THING_1,    .value1=one};
struct my_struct s3 = {.flags=THING_1,    .value2=two};
```

In the declaration of the structured variable "s1," the elements "flags," "value 1" and "value 2" of the "my_struct" structured data type are each assigned a value. In the declaration of the structured variable "s2," only the "flags" and "value1" elements are assigned values. In the declaration of the structured variable "s3," only the "flags" and "value2" elements are assigned values. Note that a placeholder is not required for the "value1" element even though it was not initialized. In this case, if the "my_struct" structured data type had numerous fields that are not always initialized, the task of declaring and initializing many "my_struct" variables in a software project would not be unduly complex because unused fields can simply be ignored. There is no need for placeholders.

Applicant submits that it would be beneficial for language processors to enforce the use of designated initializers by issuing appropriate diagnostics. This would allow earlier detection of problems or potential problems stemming from the improper use of positional initializers. To that end, the language processor 32 is adapted to evaluate structured variable initializations and intervene if an initialization uses an improper initializer (e.g., a positional initializer) when the structured data type requires designated initializers.

One way that this could be done is to maintain an information resource such as a list, a database or other information entity that specifies structured data types requiring designated initializers. The language processor 32 could then consult the information resource as part of its operations. As the language processor 32 parses structured variable initializations, it will thus know which initializations should be inspected to ensure compliance with the designated initialization requirement. The information resource could be maintained as part of the language processor itself, or externally thereof, such as in association with a particular software project or the source code 34 itself. In FIG. 3, reference numeral 36 represents one example of such an information resource.

Another technique that may be used to identify structured data types requiring designated initialization is to extend the syntax for declaring a structured type to include a technique for marking the type as requiring designated initialization, such as via a type attribute or other indicator. The language processor 32 could thus determine from the source code itself which structured data types require designated initialization. The following definition for a structured data type called "my_struct_2" illustrates how such an attribute could be used:

```
struct my_struct_2 __attribute__((designated_init)) {
    int field1;
    int field2;
};
```

Note that the "_attribute_" keyword is supported by existing implementations of the C programming language to specify attributes of data types in data type definitions, including but not limited to "struct" and "union" structured data types. However, the currently-allowed types of "_attribute_" do not include the "designated_init" attribute specified above. One way that the language processor 32 could be implemented is as a modified a C-language compiler that supports the "designated_init" attribute. Existing interpreters for interpreted languages and static analyzers could be similarly modified to support such an attribute. When the attribute is detected in the definition of a structured data type, the language processor would inspect subsequent variable initializations based on the structured type for compliance with the designated initializer requirement.

Following are a set of example initializations of the "my_struct_2" structured data type. The declarations of the first two structured variables "s1" and "s2" use positional initializers. As indicated by the accompanying comments, these initializations would cause the language processor 32 to generate a diagnostic. The declarations of the second two structured variables "s3" and "s4" correctly use designated initializers. As indicated by the accompanying comments, these would not generate warnings.

```
struct my_struct_2 s1 { 1, 2 };                          /* warning */
struct my_struct_2 s2 { 1 };                             /* warning */
struct my_struct_2 s3 { .field1 = 1, .field2 = 2 };      /* no warning */
struct my_struct_2 s4 { .field1 = 1 };                   /* no warning */
```

Referring back to the definition for the "my_struct_2" structured data type, it will be seen that the "designated_init" attribute applies to the data type as a whole, and thus governs each of its elements (i.e., "field1" and "field2"). An alternative technique would be to allow such an attribute to be separately specified for individual fields. This technique could be used if a structured data type has a stable portion amenable to positional initialization and a varying portion that requires designated initialization. Consider the following example based on the "my_struct" structured data type introduced above. In the below-illustrated type definition, language processor 32 is advised that the first element can be initialized in any suitable fashion but the second two elements require designated initialization:

```
struct my_struct {
    uint32_t flags;
    __attribute__((designated_init)) char *value1;
    __attribute__((designated_init)) uint32_t value2;
};
```

The following initialization of a structured variable "s1" based on the "my_struct" data type would not generate any warnings because designated initializers are used for all of the elements:

```
struct my_struct s1 = {
    .flags = THING_1 & THING_2,
    .value1 = one,
    .value2 = two,
}; /* No warnings */
```

The following initialization of a structured variable "s2" based on the "my_struct" data type would also not generate any warnings because a designated initializer is used for the "value1" element:

```
struct my_struct s2 = {
    THING_2,
    .value2 = red,
}; /* No warnings */
```

In contrast, the following initialization of a structured variable "s3" based on the "my_struct" data type would generate a warning because a positional initializer is used for the "value1" element:

```
struct my_struct s3 = {
    THING_1,
    blue,
}; /* Warning about positional initialization of value1*/
```

Regardless of how the language processor 32 determines which structured data types require designated initialization, the language processor can issue a diagnostic (such as a warning, an error, or even a refusal to build object code) when it encounters a positional initializer for a variable of whose structured data type requires designated initialization.

Note that struct-type data structures are not the only structured data types that benefit from designated initialization compliance. The disclosed technique could also be used for other structured data types, such as unions, and arrays.

An example of using the "designated_init" attribute for a union is shown below:

```
union my_union __attribute__((designated_init)) {
    int id;
    char *name;
}
```

Structured variables based on the "my_union" data type may be initialized as follows, with the first two initializations for the variables "u1" and "u2" generating no diagnostics and the second two initializations for the variables "u3" and "u4" generating diagnostics stemming from the use of positional initializers:

```
union my_union u1 { .id = 1 };            /* no warning */
union my_union u2 { .name = "zax" };      /* no warning */
union my_union u3 { 3 };                  /* warning */
union my_union u4 { "north" }; /* Not valid C; positional
initializer inits id */
```

An example of using the "designated_init" attribute for an array is shown below:

```
typedef size_t (*char_handler) (char *);
typedef char_handler char_handlers[256]
    __attribute__((designated_init));
```

Structured variables based on the "char_handlers" data type may be initialized as follows without generating diagnostics:

```
char_handlers whitespace_handler = {
    ['\t'] = handle_tab,
    [' '] = handle_space,
    ['\n'] = handle_lf,
    ['\r'] = handle_cr,
}; /* no warning */
```

Structured variables based on the "char_handlers" data type may likewise be initialized as follows without generating diagnostics:

```
char_handlers utf8_handler = { /* Uses GCC extension:
ranges */
    [0x00 .. 0x7F] = handle_ascii,
    [0xC2 .. 0xDF] = handle_utf8_2,
    [0xE0 .. 0xEF] = handle_utf8_3,
    [0xF0 .. 0xFF] = handle_utf8_4,
}; /* no warning */
```

Structured data types based on the "char_handlers" data type may likewise be initialized as follows, but would result in diagnostics due to the use of a positional initializer:

```
char_handlers null_handler = {
    handle_null,
}; /* warning */
```

The following initialization for a structured variable based on the "char_handlers" data type would also produce a diagnostic based on the use of positional initializers:

```
char_handlers bell_handler = {
    NULL, NULL, NULL, NULL, NULL, NULL, NULL,
    handle_bell,
}; /* warning */
```

The disclosed technique may also be used with compound literal initializations. For example, consider the definition for the "my_struct_2" structure data type discussed earlier:

```
struct my_struct_2 __attribute__((designated_init)) {
    int field1;
    int field2;
};
```

Compound literals based on the "my_struct_2" data type can be initialized in the manner shown below. The first initialization generates no warning whereas the second initialization does due to the presence of positional initializers, as follows:

```
extern void f(struct my_struct_2 *);
void g(void)
{
    f(&(struct my_struct_2){ .field1 = 1, .field2 =
2 }); /* no warning */
    f(&(struct my_struct_2){ 1, 2 });
    /* warning */
}
```

As another example of compound literal initialization, consider the definition for the "my_union" structure data type discussed earlier:

```
union my_union __attribute__((designated_init)) {
    int id;
    char *name;
}
```

Compound literals based on the "my_union" data type can be initialized in the manner shown below. The first two initializations generate no warning whereas the third initialization does due to the presence of a positional initializer, as follows:

```
extern void f(union my_union *);
void g(void)
{
    f(&(union my_union){ .id = 5 });         /* no
warning */
    f(&(union my_union){ .name = "south" }); /* no
warning */
    f(&(union my_union) { 7 });              /* warning
*/
}
```

Although the foregoing examples of structured data types are all based on the C programming language, it should be understood that the technique disclosed herein may be used with other languages that support both designated and positional initializers. Examples of such languages include D, Ada and Haskell.

For example, a structured data type written in the D programming language might use the following syntax (comprising a pragma directive) to advise the language processor 32 that a structured data type requires designated initializers:

```
pragma(GNU_attribute, designated_init) struct my_struct {
    int f1; int f2; }
```

Structured variables based on the "my_struct" data type may be initialized as follows, with the initialization for the variable "s1" generating no diagnostic and the initialization for the variable "s2" generating a diagnostic stemming from the use of positional initializers:

```
static my_struct s1 = { f1: 1, f2: 2 };    /* no warning */
static my_struct s2 = { 1, 2 };            /* warning */
```

A structured data type written in the Ada programming language might use the following syntax (comprising a pragma directive) to advise the language processor 32 that a structured data type requires designated initializers:

```
procedure UseRecord is
    type DATE is
        record
            Year   : INTEGER range 1970..2038;
            Month  : INTEGER range 1..12;
            Day    : INTEGER range 1..31;
        end record;
    Pragma Designated_Init (Entity => DATE);
```

Structured variables based on the "DATE" data type may be initialized as follows, with the initializations for the variables "Date1" and "Date3" generating no diagnostics, and the initializations for the variables "Date2" and "Date4" generating diagnostics stemming from the use of positional initializers:

```
Date1 : DATE := (Year => 1983, Month => 9, Day => 27); --
No warning
Date2 : DATE := (1976, 2, 3); -- Warning
begin
    Date3 := (Year => 1992, Month => 8, Day => 25); -- No
warning
    Date4 := (1985, 11, 20); -- Warning
end UseRecord;
```

A structured data type written in the Haskell programming language might use the following syntax (the Haskell pragma syntax (-# #-)) to advise the language processor 32 that a structured data type requires designated initializers:

```
data Date = Date {-# REQUIRE_FIELD_NAMES #-} {
    year,month,day :: Integer }
```

Structured variables based on the "Date" data type may be initialized as follows, with the initialization for the variable "Date1" generating no diagnostic, and the initialization for the variable "Date2" generating a diagnostic stemming from the use of positional initializers:

```
date1 = Date { year = 1983, month = 9, day = 27 } -- No
warning
date2 = Date 1976 2 3 -- Warning
```

Pattern matching that implements initializations based on the Haskell "Date" data type may also enforce designated initializers, with the initialization in the "useYear" statement generating no diagnostic, and the initialization in the "useMonth" statement generating a diagnostic stemming from the use of a positional initializer:

```
useYear (Date { year = y }) = doSomethingWith y -- No
warning
useMonth (Date _ month _) = doSomethingElseWith m --
Warning
```

Figure 4:
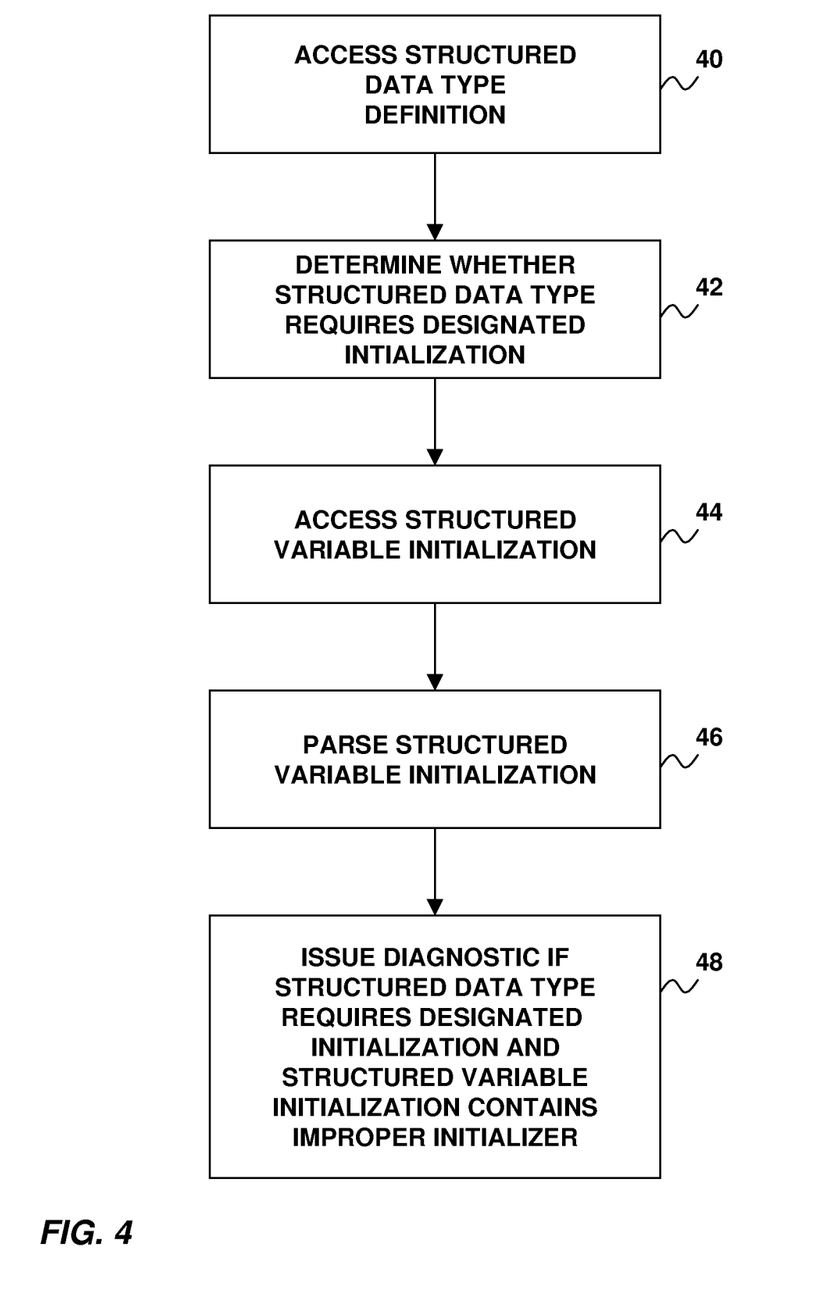
FIG. 4 is a flow diagram showing example language processing logic in accordance with the present disclosure.

FIG. 4 is a flow diagram illustrating operations that may be performed by the language processor 32 in accordance with the foregoing discussion. In block 40, the language processor accesses the source code 34 of FIG. 3, some or all of which will be resident in a machine or on a machine-useable medium, such as the memory 16 of FIG. 2, a disk, a tape, etc. The source code 34 is assumed to comprise a definition for a structured data type. In block 42, the language processor 32 numerically determines whether the structured data type requires designated initialization. "Numerically" as used herein signifies "machine-implemented." As discussed above, the determination operation of block 42 could be performed using an information resource such as the resource 36 of FIG. 3. In that case, block 42 could comprise the language processor 32 performing a look-up of the structured data type in the information resource 36. Alternatively, the structured data type definition may utilize a syntax, such as a type attribute or other indicator, signifying that the type requires designated initialization, as discussed above. The language processor 32 could then implement block 42 by numerically parsing the structured data type definition to check for the presence of such a syntax. In block 44, the language processor 32 accesses a portion of the source code 34 that comprises an initialization of a structured variable that is declared to use the structured data type evaluated in block 42. In block 46, the language processor 32 numerically parses the structured variable initialization. If it was determined in block 42 that the structure data type requires designated initialization, the parsing operation checks the initialization for conformance. In block 48, the language processor 32 performs a diagnostic action (such as issuing a diagnostic output) if the structured variable initialization comprises an improper initializer. As indicated above, the diagnostic action could include issuing a warning or error message, issuing a non-text output, flagging code in an integrated development environment (IDE), refusing to compile, interpret or further analyze the source code, performing some combination of the foregoing, etc. The interface 38 in FIG. 3 illustrates one example of a diagnostic output, namely, a warning that the initialization of a structured variable "s1" based on a structured data type "mystruct" contains a positional initializer for one of its elements, and that a designated initializer should be used instead.

Figure 5:
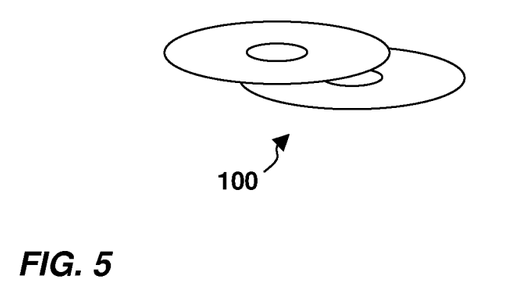
FIG. 5 is a diagrammatic illustration showing example media that may be used to provide a computer program product for implementing language processing in accordance with the present disclosure.

Accordingly, a technique for enforcing the use of designated initializers in structured type initializations has been disclosed. It will be appreciated that the foregoing concepts may be variously embodied in any of a data processing system, a machine implemented method, and a computer program product in which programming logic is provided by one or more machine-useable non-transitory media for use in controlling a data processing system to perform the required functions. Exemplary machine-useable non-transitory media for providing such programming logic are shown by reference numeral 100 in FIG. 5. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality, such as an operating system. The programming logic could also be provided by other portable media (such as floppy disks, flash memory sticks, etc.), or media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, infrared, semiconductor system or apparatus or device or medium (such as a network), or other entity that can contain, store, communicate or transport the programming logic for use by or in connection with a data processing system, computer or other instruction execution system, apparatus or device.

While various embodiments of the invention have been described, it should be apparent that many variations and alternative embodiments could be implemented in accordance with the invention. For example, a feature could be added to the language processor 32 that allows a user to selectively enable or disable enforcement of the use of designated initializers, thereby suppressing such processing and the implementation of diagnostic actions if positional initializers are improperly used. By way of example only, one way that this feature could be implemented is by way of a flag (e.g., "-Wdesignated-init") that is passed to the language processor 32 when it is invoked. It is understood, therefore, that the invention is not to be in any way limited except in accordance with the spirit of the appended claims and their equivalents.

What is claimed is:

1. A machine-implemented method for enforcing the use of designated initializers in structured data type initializations, comprising:
   determining whether a structured data type requires a designated initializer;
   said determining being performing by either:
   evaluating a structured data type definition for the presence of a syntax specifying that said structured data type requires designated initialization; or
   accessing an information resource comprising an indication whether said structured data type requires designated initialization;
   parsing an initialization of a structured variable declared to use said structured data type to determine whether said initialization employs an improper initializer that is inconsistent with said structured data type; and
   performing a diagnostic action if said initialization comprises an improper initializer.

2. A method in accordance with claim 1, wherein if evaluating said structured data type definition for the presence of a syntax, said structured data type is defined using a designated initializer attribute in said syntax, and wherein determining whether said structured data type requires designated initialization comprises identifying said attribute.

3. A method in accordance with claim 2, wherein said designated initializer attribute is individually associated with one or more elements of said structured data type definition.

4. A method in accordance with claim 1, wherein if accessing an information resource, said information resource comprising a portion of source code that contains said initialization, or resources of a project that utilizes said source code, or a language processor that processes said source code.

5. A method in accordance with claim 1, further including providing the ability to selectively disable enforcement of the use of designated initializers.

6. A system for enforcing the use of designated initializers in structured data type initializations, comprising:
   one or more processors;
   a memory coupled to said one or more processors, said memory including a computer useable medium tangibly embodying at least one program of instructions executable by said processor to perform operations, comprising:
   determining whether a structured data type requires a designated initializer;
   said determining being performing by either:
   evaluating a structured data type definition for the presence of a syntax specifying that said structured data type requires designated initialization; or
   accessing an information resource comprising an indication whether said structured data type requires designated initialization;
   parsing an initialization of a structured variable declared to use said structured data type to determine whether said initialization employs an improper initializer that is inconsistent with said structured data type; and
   performing a diagnostic action if said structured variable initialization comprises an improper initializer.

7. A system in accordance with claim 6, wherein if evaluating said structured data type definition for the presence of a syntax, said structured data type is defined using a designated initializer attribute in said syntax, and wherein determining whether said structured data type requires designated initialization comprises identifying said attribute.

8. A system in accordance with claim 7, wherein said designated initializer attribute is individually associated with one or more elements of said structure data type definition.

9. A system in accordance with claim 6, wherein if accessing an information resource, said information resource comprising a portion of source code that contains said initialization, or resources of a project that utilizes said source code, or a language processor that processes said source code.

10. A system in accordance with claim 6, wherein said operations further comprise providing the ability to selectively disable enforcement of the use of designated initializers.

11. A computer program product for enforcing the use of designated initializers in structured type declarations, comprising:
   one or more machine-useable non-transitory media;
   logic provided by said one or more media for programming a data processing platform to operate as by:
   determining whether a structured data type requires a designated initializer;
   said determining being performing by either:
   evaluating a structured data type definition for the presence of a syntax specifying that said structured data type requires designated initialization; or accessing an information resource comprising an indication whether said structured data type requires designated initialization;

parsing an initialization of a structured variable declared to use said structured data type to determine whether said initialization employs an improper initializer that is inconsistent with said structured data type; and performing a diagnostic action if said structured variable initialization comprises an improper initializer.

12. A computer program product in accordance with claim 11, wherein if evaluating said structured data type definition for the presence of a syntax, said structured data type is defined using a designated initializer attribute in said syntax, and wherein determining whether said structured data type requires designated initialization comprises identifying said attribute.

13. A computer program product in accordance with claim 12, wherein said designated initializer attribute is individually associated with one or more elements of said structure data type definition.

14. A computer program product in accordance with claim 11, wherein if accessing an information resource, said information resource comprising a portion of source code that contains said initialization, or resources of a project that utilizes said source code, or a language processor that processes said source code.

15. A computer program product in accordance with claim 11, wherein said logic provided by said one or more media are for programming a data processing platform to further operate by providing the ability to selectively disable enforcement of the use of designated initializers.

16. A method for enforcing the use of designated initializers in structured type declarations, comprising:

accessing source code comprising a definition for a structured data type; determining whether said structured data type requires designated initialization;

accessing source code comprising an initialization of a structured variable conforming to said structured data type;

parsing said structured variable initialization;

performing a diagnostic action if said structured variable initialization comprises an improper initializer;

said structured data type definition using a syntax for specifying that said structured data type requires designated initialization, and wherein determining whether said structured data type requires designated initialization comprises evaluating said syntax;

said syntax including a designated initializer attribute associated with said structured data type definition or with one or more elements of said structure data type definition.

17. A method in accordance with claim 16, further including providing the ability to selectively disable enforcement of the use of designated initializers.

* * * * *